(12) United States Patent
Chang et al.

(10) Patent No.: US 11,451,828 B1
(45) Date of Patent: Sep. 20, 2022

(54) IMAGE COMPRESSION TECHNIQUE FOR LOW-POWER, ALWAYS-ON CAMERA SYSTEMS

(71) Applicant: OmniVision Technologies, Inc., Santa Clara, CA (US)

(72) Inventors: Yu-Wei Chang, Cupertino, CA (US); Wei-Feng Huang, Saratoga, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/378,610

(22) Filed: Jul. 16, 2021

(51) Int. Cl.
*H04N 19/68* (2014.01)
*H04N 19/186* (2014.01)
*H04N 19/423* (2014.01)
*H04N 19/70* (2014.01)
*H04N 19/176* (2014.01)

(52) U.S. Cl.
CPC .......... *H04N 19/68* (2014.11); *H04N 19/176* (2014.11); *H04N 19/186* (2014.11); *H04N 19/423* (2014.11); *H04N 19/70* (2014.11)

(58) Field of Classification Search
CPC .... H04N 19/68; H04N 19/176; H04N 19/186; H04N 19/423; H04N 19/70
See application file for complete search history.

(56) References Cited

U.S. PATENT DOCUMENTS

| 6,941,019 B1* | 9/2005 | Mitchell | ................ H04N 19/40 375/E7.129 |
| 2002/0094028 A1* | 7/2002 | Kimoto | ................ H04N 19/107 375/E7.176 |

* cited by examiner

*Primary Examiner* — Jae N Noh
(74) *Attorney, Agent, or Firm* — Lathrop GPM LLP (57) ABSTRACT

A method of compressing and storing preview video includes performing colorspace-reduction image compression on a reference frame of a video to generate a colorspace-reduced reference frame; determining difference blocks representing areas of a subsequent image frame that differ from the reference frame and generating a difference frame comprising colorspace-reduced image data of the difference blocks; generating a video stream comprising a color palette, the colorspace-reduced reference frame, and the difference frame, and storing the video stream in an extreme low-voltage memory; and injecting, into the video stream prior to storing the video stream in the extreme low-voltage memory, a plurality of resynchronization codes for each reference frame and a plurality of resynchronization codes for each difference frame, the resynchronization codes comprising a byte sequence unique to resynchronization codes. Embodiments continue with decompressing the compressed video and using the resynchronization codes to recover from bit errors in the memory.

15 Claims, 4 Drawing Sheets

Data from Low Power Compression Engine 108

| Block Lengths in Small, Full-Voltage, Header Memory 402 | Compressed Image Data in Large, Low-Voltage, Semiconductor Memory 404 |

Data To Image Processor 120

IMAGE COMPRESSION TECHNIQUE FOR LOW-POWER, ALWAYS-ON CAMERA SYSTEMS

BACKGROUND

Cockpit voice recorders and flight data recorders record and preserve sensor readings in the minutes before an airplane crash; these records have proven valuable in determining causes of crashes.

There are many other occasions where a record that begins prior to a triggering event can be valuable. For example, but not limitation, a video record of the last few minutes before an automobile "accident" at an intersection can determine, for example, which driver ran a stop sign or red traffic light; and an audio-video recording of the last few minutes of a policeman's interaction with others before the policeman draws and fires his weapon can help determine if the shooting was justified in addition to being useful for training. Video recorded by surveillance cameras beginning shortly before a thief breaks into a building, car, or automated teller machine can provide better and different views of a suspect than those recorded after the break-in and can be useful in identifying the suspect. Further, video records that begin shortly before a parked car is struck by a second vehicle may provide a better view of the second vehicle's license plate than video records that begin only after the parked car is struck.

An always-on image sensing system that records video in semiconductor memory, and responds to triggering events by preserving some pre-event video with some post-event video can be useful in all the above-mentioned situations. The system may transfer the pre- and post-event video in nonvolatile memory or radio that video to other devices for further processing and potentially for human review

SUMMARY

DETAILED DESCRIPTION OF THE EMBODIMENTS

Image Sensing System

Figure 1:
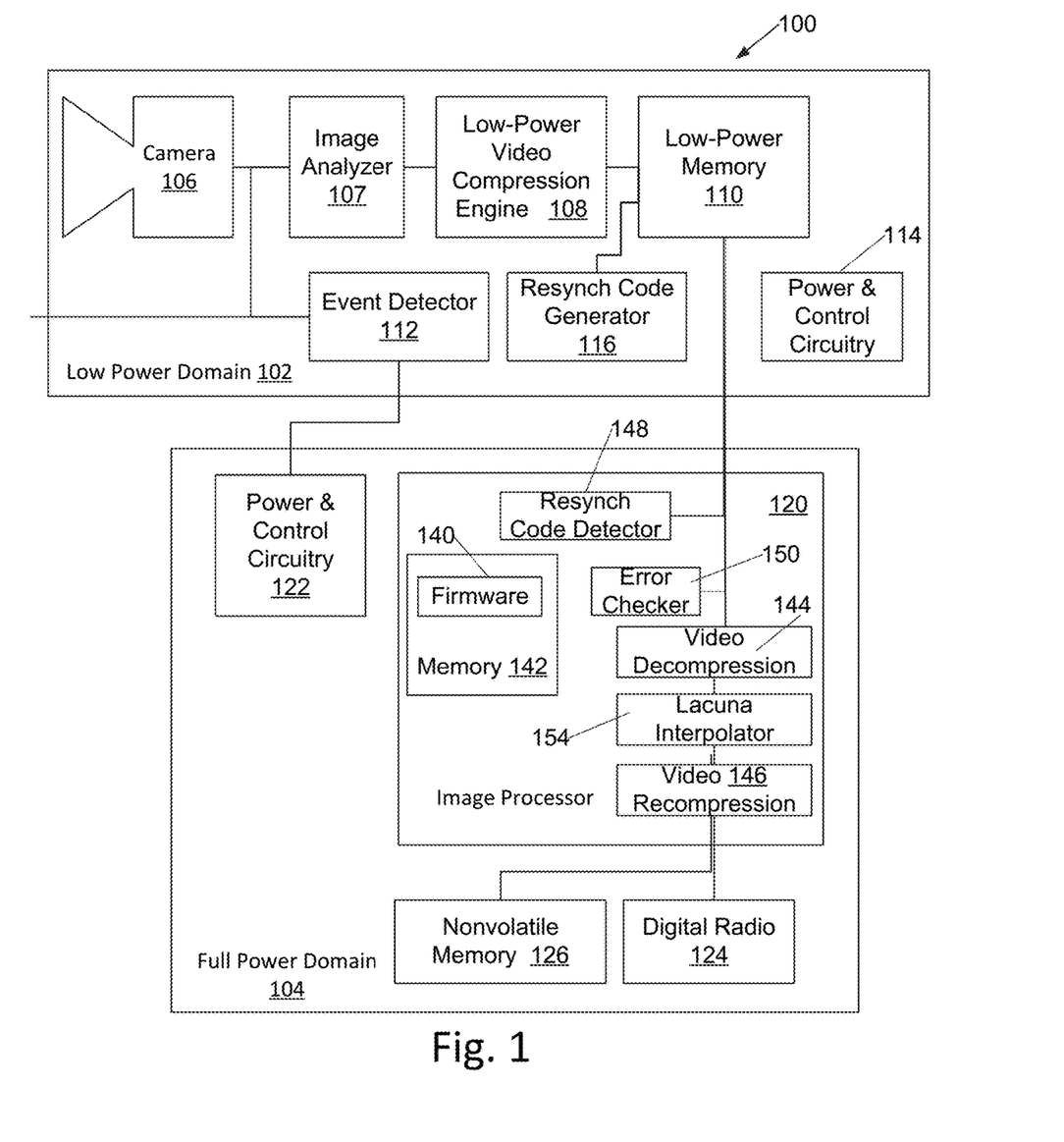
FIG. 1 is a block diagram of an image sensing system having an extreme low-power domain and a full-power domain activated on events, the low-power domain configured to detect events and capture pre- and post-event video, in embodiments.

An always-on image sensing system 100 should have extreme low power consumption between detected events, particularly where systems are battery powered. The challenge involves not only low-power image sensor architecture and low-power edge computations, and large amounts of video data that must be stored while consuming little power.

Imaging system 100 includes an extreme low-power domain 102, and may include a full-power domain 104 that is activated on events, the low-power domain 102 being configured to detect events and capture pre- and post-event video. Low-power domain 102 includes an electronic video camera 106, a video compression engine 108, a low-power semiconductor memory 110, an event detector 112, and associated power and control circuitry 114. Imaging system 100 operates according to method 200 of FIG. 2.

Figure 2:
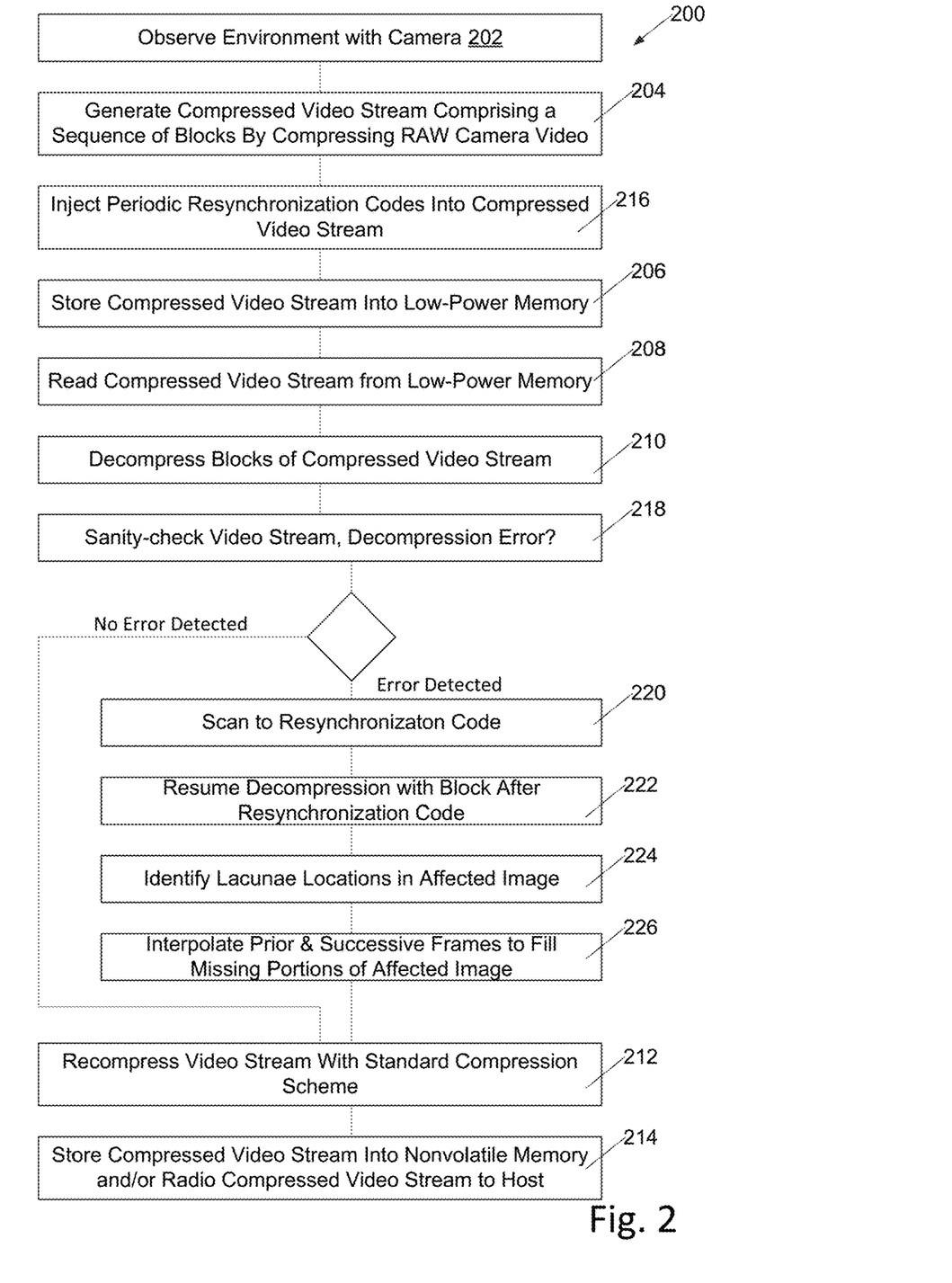
FIG. 2 is a flowchart of a method of recovering from a bit error while decompressing video that has been stored in an ultra-low-power semiconductor memory, in embodiments.

Camera 106 is configured to observe 202 the environment and as a source of raw or uncompressed video data as a sequence of images. Camera 106 feeds the sequence of images to image analyzer 107 that determines characteristics of the image that are useful in compressing images and the video stream, such as a histogram of colors useful in colorspace reduction. These image characteristics and the sequence of images is fed to compression engine 108 that compresses 204 the sequence of images into a compressed video data that is stored 206 as a compressed video stream into low power semiconductor memory 110. To achieve extreme low power operation, the low power memory operates at an extreme low voltage, but extreme low voltage operation comes with a cost of higher bit error rates than when similar memory is operated at higher voltage. These bit error rates become significant at extreme low voltages and extreme low power operation. Low power semiconductor memory 110 in an embodiment is a static random-access memory (SRAM) operated with a power supply voltage of less than 0.7 volts.

Compressed video data is typically stored 206 as a compressed video stream, the stream including a sequence of blocks of variable size, each block having a header incorporating a block length and specifying whether the block contains colorspace-reduced data, a color palette, or other compressed data.

Event detector 112 may receive video from camera 106 and detect events based upon significant changes in image content. Event detector 112 may also receive externally-detected events such as but not limited to motion detected by infrared motion sensors, or alarm signals from window-breakage sensors. Upon detection of an event by event detector 112, event detector 112 communicates with power and control circuitry 122 of full-power domain 104 to power up full-power domain 104, whereupon the compressed video stream is read 208 from low-power memory 110 into image processor 120, image processor 120 being configured by firmware 140 in memory 142 to perform as a video decompression unit 144 and, in some embodiments, a video recompression unit 146, where the video image frames are decompressed 210 from a quick-to-compress compressed video format as stored in low power semiconductor memory 110 and may be recompressed 212 into an industry-standard video compression format. In alternative embodiments, separate dedicated hardware may perform functions of video decompression interpolation to fill lacunae, and recompression. Once recompressed, the industry-standard compressed video is written 214 to nonvolatile memory 126, transmitted over digital radio 124 to other devices, or both written to nonvolatile memory 126 and transmitted over digital radio 124. In an alternative embodiment, the quick-to-compress compressed video stored in low-power memory 110 is stored in an industry-standard compressed video format modified to add redundancies and resynchronization information; in this embodiment, the redundancies and resynchronization information are removed after decompression to interpolate to fill any lacunae and before writing 214 the industry-standard compressed video to nonvolatile memory 126, transmitting the video over digital radio 124 to other devices, or both writing nonvolatile memory 126 and transmitting over digital radio 124.

In embodiments, digital radio 124 may be a Bluetooth radio, and in other embodiments digital radio 124 may be either an IEEE 802.11-compatible radio or a cellular telephone digital radio configured to industry-standard video over the internet. In an alternative embodiment, a wired interface (not shown), such as MI PI or USB, replaces digital radio 124 to permit transferring compressed video to other devices.

Video Compression

Video is typically recorded as a sequence of image frames.

Some video compression devices compress each image frame,

Many video compression devices, including low-power video compression engine 108, produce compressed video by compressing a first image frame as a compressed reference frame followed by a sequence of one, two, four, or more difference, or inter-picture interpolated, frames—the difference frames representing differences between the first image frame and a subsequent image frame. When differences between a next image frame and the reference frame exceed a threshold, or a predetermined number of image frames have been compressed as difference frames, the pattern of reference frame and difference frames repeats with another image frame compressed as a compressed reference frame followed by an additional sequence of image frames compressed as difference frames. In other image compression techniques, such as in industry-standard H.264 or MPEG-4 encoding a difference frame may be based on up to 16 reference frames In an alternative embodiment, low-power video compression engine 108 uses single-frame-compression techniques without reference frames.

Each difference frame typically incorporates a frame header followed by a sequence of difference blocks, each difference block may have a block header giving block dimensions and position information where the block should replace image information from the reference frame when the reference frame and difference frame are used reconstruct a compressed image frame. Each difference block also includes the image information that should replace a portion of the reference frame. In alternative compression schemes such as H.264, each difference block may have a block header giving block dimensions and position information of a portion of a reference frame image with indicators of where in a difference frame that portion should be copied.

The compressed reference frame may be compressed by color-space reduction or other image compression techniques known in the art. Image frames may be compressed through palette reduction, through discrete cosine transform methods such as industry-standard Joint Photographic Expert's Group (JPEG) compression, or other single-frame-compression techniques.

For example, but not limitation, in color-space reduction image compression methods useful to compress both reference and difference frames, uncompressed data may be encoded by deriving from the uncompressed data a color palette of up to a number near 256 colors, each color of the color palette approximates colors that appear in the compressed image and is represented by a single 8-bit byte in colorspace-reduced video. Each color in the palette decodes to 8 to 16 bits each of red, green, and blue intensities for a total 24 to 48 bits of color information. The color palette is then combined in a compressed image with image information encoded as a sequence of 8-bit bytes. Each of the 8-bit bytes represent a pixel of the uncompressed image, each byte being an index into the color palette. The compressed images can be decoded by receiving the color palette, then receiving the 8-bit code bytes of image information. As the image information code bytes are received, the color palette is used to decode pixels into red, green, and blue intensities for each pixel. Such color space reduction may reduce data volumes for the compressed image by about a factor of three.

In a particular embodiment, to avoid color artifacts in dark areas of the image, a lossless or near-lossless compression method is used to compress dark-pixel areas of the image, while other areas are compressed with a color palette-based colorspace-reduction method. In alternative embodiments, a lossless or near-lossless compression method is used to compress dark-pixel areas of the image, while other areas are compressed with a transform-based image compression method When colorspace reduction or transform-based image compression are combined with a lossless or near-lossless compression method for compressing an individual image by low power video compression engine 108, block lengths must be included in block headers to allow decoders to determine which method is in use for each pixel.

Effects of Bit Errors

If a memory is used to store uncompressed image data, bit errors in the memory wouldn't cause serious error propagation. For uncompressed video data, the errors would be limited inside a very small area where is affected by the color interpolation.

When low-power semiconductor memory 110 stores 206 a compressed video data stream from low-power compression engine 108, bit errors may propagate through a frame and several subsequent frames since even a single bit error can affect subsequent decoding, potentially corrupting significant portions of one or more frames.

For example, if memory 110 is used to store compressed video using any type of image compression incorporating block lengths into the compressed video stream, even a single-bit error might cause the entire subsequent video stream to not be decodable because even a single bit error in a block length could cause loss of synchronization between encoder and decoder. If synchronization is lost subsequent block headers and frame headers may not be recognized as block or frame headers by the decoder; indeed, block headers may be interpreted as part of data and vice versa. Even bit errors in parts of the video stream other than block lengths can affect remaining portions of a frame or subsequent frames; consider as an example a bit error in a color palette that would corrupt pixels matching that color throughout a frame, or a bit error in a reference frame causing corruption of pixels in following frames unless replaced by a difference frame.

Resynchronization Codes

To limit effect of bit errors in the compressed video stream, resynchronization code generator 116 or resynchronization code insertion unit periodically injects 216 resynchronization codes between blocks of the video stream as it stored in low power semiconductor memory 110. Each resynchronization code is a sequence of one or more bytes that cannot occur within the video stream itself. For example, but not limitation, during colorspace reduction a color palette of less than 256 entries may be used with one particular code (such as "FF" hex) that might otherwise appear in blocks of colorspace-reduced video reserved, with that code appearing in each resynchronization code.

As the compressed video stream is read into the image processor, image processor 120 error-checks 218 the stream for loss of synchronization or other errors in error checker 150. In embodiments, error checker 150 uses one or more of range checks on block sizes, validation of block types, vertical parity checks on block data, "sanity" or range checks on block headers, and cyclic redundancy checks on blocks and/or block headers to detect bit errors in the compressed video stream that may lead to decompression errors.

As the compressed video stream is read from the low power semiconductor memory 110 into the image processor 120, a resynchronization code detector 148 scans the stream for resynchronization codes.

Upon error checker 150 detecting errors in the compressed video stream, or when errors are detected during video decompression such as range errors on decompressed pixel data, video decompression stops, the compressed video stream is scanned 220 by resynchronization code detector 148 until a following resynchronization code is found, whereupon video decompression resumes 222; the stopping and resumption of video decompression creates a gap or lacuna in the frame being decompressed.

In embodiments, to allow the image processor 120 to know where in an image frame the video decompression should resume, the resynchronization code includes a position in the image frame. Each lacuna has an associated location in a video frame where an error was detected and decompression stopped, and another location in the video frame where the resynchronization code was detected and decompression restarted, it therefore has identified 224 locations of the lacuna.

Lacuna Concealment

To hide the gap or lacuna in the decompressed frame, lacuna interpolator 154 performs an interpolation 226 to generate a replacement pixel for all missing pixels (pixels of lacunae) from corresponding pixels in prior frames and, if corresponding pixels are present, corresponding pixels in successor frames. These replacement pixels are substituted into the lacunae to repair the decompressed images.

Finally, the decompressed images may be recompressed as compressed video by recompression unit 146 using an industry-standard compression method, which may in some embodiments be MPEG-4 level 10 H.264 video compression codec compatible. The recompressed video is written to nonvolatile memory 126 and/or transmitted to a host by digital radio 124 as determined by system configuration and settings.

Once both the video saved in the low-power semiconductor memory before the triggering event and sufficient video observed by camera 106 after the triggering event have been compressed and saved in nonvolatile memory 126 or transmitted to a host by digital radio 124, the full-power domain is depowered; video continues to be recorded by camera 106, compressed, and stored in the low-power semiconductor memory 110. In some embodiments the video observed by camera 106 after the triggering event ends after a predetermined time and in other embodiments after a current or repeated triggering event ends.

Resynchronization Codes in Images

Figure 3:
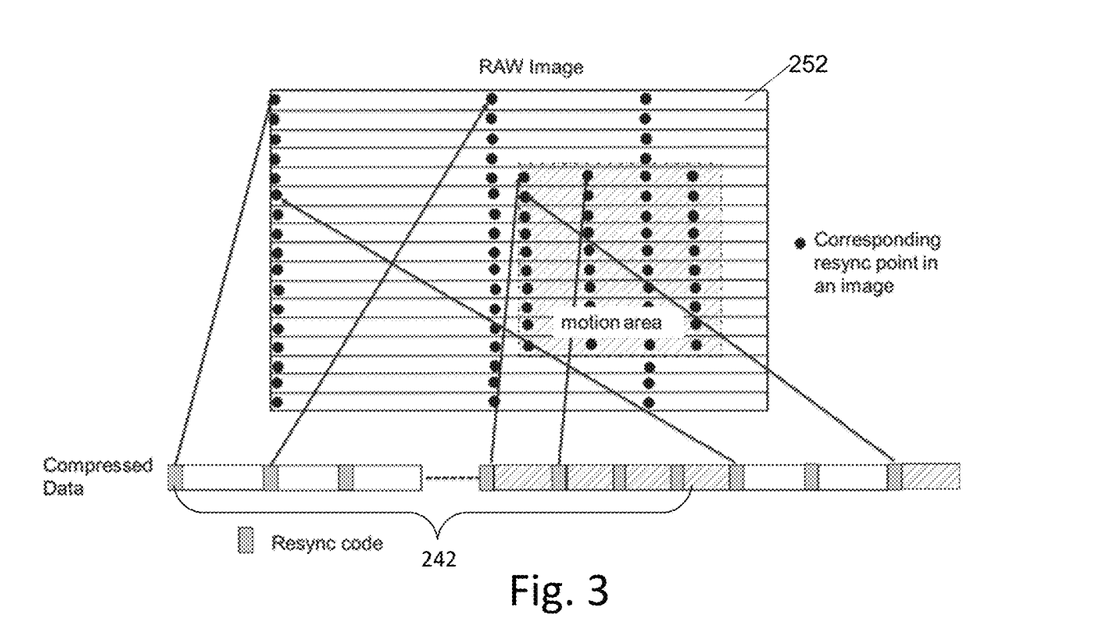
FIG. 3 illustrates potential locations in image frames where resynchronization codes may be inserted into a compressed video stream, in embodiments.

FIG. 3 illustrates that multiple resynchronizations may be injected into each image frame and each motion, or difference, frame.

Split Memory Embodiment

Figure 4:
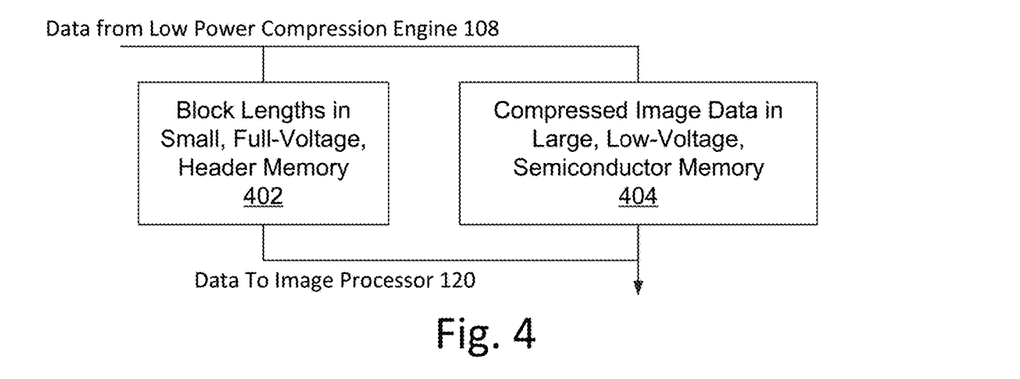
FIG. 4 is a block diagram of a split high-and-low-voltage memory subsystem that stores block headers in a separate memory operated at high voltage from image data of blocks stored in low-voltage memory, in embodiments.

In an alternative embodiment, low-power semiconductor memory 110 is split into two memories as illustrated in FIG. 4. In this embodiment, frame 502, 510 and block headers 504, 506, 508, 512, 514 and in particular, block lengths in the block headers, are stored in a header memory 402 operated at a full, relatively high, voltage to ensure bit error rates are low. Since bit errors are very rare in the header memory, there is only a small chance of synchronization loss and image corruption that extends over multiple frames.

Figure 5:
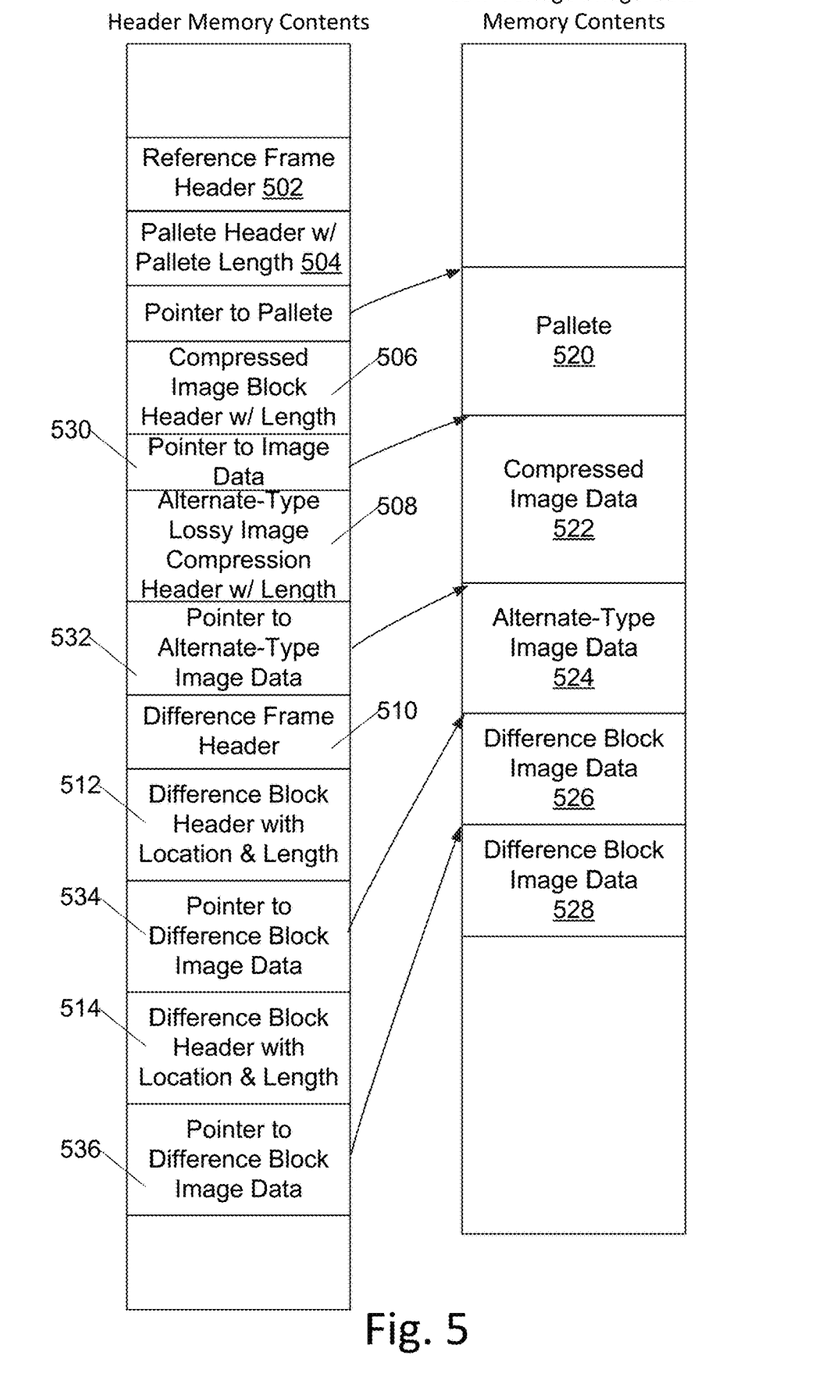
FIG. 5 is an illustration of blocks of compressed video distributed with block headers including lengths in a small, full-voltage, header memory with data of each block stored in a larger, low-voltage, low-power, memory.

The data portion of each block, known herein as the block bodies 520, 522, 524, 526, 528, is located in a larger, low-power, low-voltage, semiconductor memory 404. The block bodies in low power semiconductor memory 404 contain such data as colorspace-reduced image data, and difference data for difference frames, with only a pointer 530, 532, 534, 536 to the block bodies stored in the header memory 402, as illustrated in FIG. 5. With this embodiment, the critical block lengths that, when corrupted, cause synchronization loss between compression engine 108 and decompression unit 144 are in the low-bit-error-rate higher-voltage header memory 402 and less likely to become corrupted than the image data in the higher-bit-error-rate low-voltage memory 404.

Combinations

A method designated A of compressing and storing preview video includes receiving uncompressed video and analyzing a reference frame of the uncompressed video to determine a color palette; using the color palette, performing an image compression selected from colorspace-reduction image compression and transform-based image compression on the reference frame to generate a compressed reference frame; determining difference blocks representing areas of a subsequent image frame that differ from the reference frame by comparing the reference frame and the subsequent image frame of the uncompressed video; generating a compressed difference frame; generating a video stream comprising the color palette, the compressed reference frame, and the compressed difference frame, and storing the video stream in an extreme low-voltage memory; and injecting, into the video stream prior to storing the video stream in the extreme low-voltage memory, a plurality of resynchronization codes for each reference frame and a plurality of resynchronization codes for each difference frame, the resynchronization codes comprising a byte sequence unique to resynchronization codes.

A method designated AA including the method designated A wherein resynchronization codes of the plurality of resynchronization codes comprise a position in an image frame.

A method of compressing and decompressing preview video designated AB including the method designated A or AA and further including: reading the video stream and using the color palette and compressed reference frame to decompress a decompressed reference frame; using the decompressed reference frame and the difference frame to decompress a subsequent image frame; detecting a bit error in the video stream and stopping decompression of the preview video at a first location in an image frame; scanning for a resynchronization code in the video stream; and resuming decompression of the preview video after the resynchronization code at a second location in the image frame.

A method designated AC including the method designated AB and further including interpolating between a prior frame and a subsequent frame to determine interpolated pixels, and insertion of the interpolated pixels into an image frame between the first and second location in the image frame.

A low power system designated B includes a source of uncompressed video; a first compression engine configured to receive the uncompressed video and to produce first compressed video; a resynchronization code generator configured to insert resynchronization codes into the first compressed video; a low-voltage semiconductor memory coupled to store the first compressed video; a decompression unit configured to read the first compressed video from the low-voltage semiconductor memory and to decompress the first compressed video to produce a decompressed video; an error checker configured to scan the first compressed video as the first compressed video is read from the low-voltage semiconductor memory; and a resynchronization code detector configured to scan the first compressed video as the first compressed video is read from the low-voltage semiconductor memory; where the decompression unit is configured to stop decompressing video upon the error checker detecting an error in a first frame and to resume decompression upon the resynchronization code detector detecting a resynchronization code.

A low power camera system designated BA including the low power system designated B wherein the source of uncompressed video is an electronic video camera.

A low power camera system designated BB including the system designated BA or B and further including a recompression unit configured to compress the decompressed video to produce a second compressed video.

A low power camera system designated BC including the system designated BB and further including an interpolation unit configured to interpolate pixels of a prior and a subsequent frame to generate interpolated pixels and to insert the interpolated pixels into the first frame.

A low power camera system designated BD including the system designated BC, BB, BA, or B further configured to store the second compressed video in a nonvolatile memory.

A low power camera system designated BE including the system designated BD, BC, BB, or BA further configured to transmit the second compressed video through a digital radio.

A low power camera system designated BF including the low power camera system designated BD, or BC, wherein the interpolation unit is configured to interpolate pixels within the first image frame between pixels decoded prior to the error checker detecting an error and the resynchronization code detector detecting a resynchronization code.

An always-on recording method designated C including: encoding an image [252] to yield an encoded-data sequence [242] that includes (i) a plurality of encoded image-segments each encoded from a respective segment of the image and (ii) a sequence of resync codes each, each resync code thereof identifying a respective one of the plurality of encoded image-segments; storing the encoded-data sequence within a memory; generating a plurality of decoded image segments by, for each resync code of the sequence of resync codes: retrieving, in sequence from the memory, the resync code and the encoded image-segment identified by the resync code; decoding the encoded image-segment identified by the resync code to yield a decoded image segment of the plurality of decoded image segments; detecting when a decoding error occurs during the step of decoding; in response to detecting the decoding error, compensating the decoded image segment to have a size defined by the resync code; and outputting the decoded image segment at a position in an output image defined by the retrieved resync code.

A method designated CA including the method designated C, the encoded-data sequence including the plurality of encoded image-segments interleaved with the sequence of resync codes, each resync code immediately preceding, in the encoded-data sequence, the encoded image-segment identified by the resync code, and retrieving including: searching for the resync code in part of the encoded-data sequence that follows a previously retrieved resync code of the sequence of resync codes; and reading the encoded image segment from between the encoded-data sequence end of the resync code and a start of a subsequent resync code of the sequence of resync codes.

A method designated CB including the method designated C or CA, each resync code of the sequence of resync codes identifying a respective encoded image-segment of the plurality of encoded image-segments by virtue of immediately preceding the encoded image-segment.

A method designated CC including the method designated C, CA, or CB, further comprising generating the decoding error when an initial-decoded size of the decoded image segment differs from the size defined by the resync code.

A method designated CD including the method designated C, CA, CB, or CC, the decoded image segment including a plurality of pixel values each mapped to a respective one of a plurality of pixel coordinates of the decoded image segment, detecting comprising detecting the decoding error at an error location of the decoded image segment, the error location being mapped to a pixel coordinate of the plurality of pixel coordinates; and resizing comprising mapping the pixel coordinate at the error location to one of (i) a pixel-value remaining in a storage medium communicatively coupled to a decoder that executes the step of decoding, (ii) a pixel-value of the encoded image mapped to a second pixel coordinate, of the encoded image, that is adjacent to the pixel coordinate and (iii) a pixel-value, of a previous image of a video stream that includes the image, mapped to the pixel coordinate.

A method designated CE including the method designated C, CA, CB, CC, or CD, when encoding, each resync code of the sequence of resync codes including at least one of (i) encoding parameters of the encoded image, and pertaining to the encoded image-segment identified by the resync code, (ii) a size of the encoded image-segments, and (iii) a start position, in the encoded image, of the encoded image-segment.

A method designated CF including the method designated C, CA, CB, CC, CD, or CE when encoding, each of the sequence of resync codes beginning with a byte sequence that is not present in any of the plurality of encoded image-segments.

A method designated CG including the method designated C, CA, CB, CC, CD, CE or CF, the image being an image of a scene and including a plurality of image-regions, and further including identifying a motion-region of the image that is an image of a scene-region, of the scene, that includes a moving object when the image was captured by an imaging device, the motion-region being one a plurality of image-regions of the image; encoding including in each of the plurality of image-regions other than the motion-region, inserting a resync code of the sequence of resync codes at a first uniform interval within regions the encoded image; and in the motion-region, inserting an injection code of the sequence of resync codes at a second uniform interval within regions the encoded image, the second uniform interval being shorter than the first uniform interval.

A method of compressing and storing preview video designated D receiving uncompressed video and performing image compression on a frame of the uncompressed video to generate a compressed frame; generating a video stream comprising the colorspace-reduced reference frame, and a difference frame, and storing the video stream in an extreme low-voltage memory; and injecting, into the video stream, a plurality of resynchronization codes for the reference frame and a plurality of resynchronization codes for the difference frame, the resynchronization codes comprising a byte sequence unique to resynchronization codes.

A method of compressing and storing preview video designated DA including the method designated D resynchronization codes of the plurality of resynchronization codes comprise a position in an image frame.

A method of compressing and decompressing preview video designated DB including the method designated D or DA and further including reading the video stream and using the compressed reference frame to decompress a decompressed reference frame; using the decompressed reference frame and the difference frame to decompress a subsequent image frame; detecting a bit error in the video stream and stopping decompression of the preview video at a first location in a selected image frame selected from the decompressed image frame and the subsequent image frame; scanning for a resynchronization code in the video stream; and resuming decompression of the preview video after the resynchronization code at a second location in the selected image frame.

A method designated DC including method designated DB further including interpolating between a prior frame and a subsequent frame to determine interpolated pixels, and insertion of the interpolated pixels into the selected image frame between the first and second location in the image frame.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of compressing and storing preview video comprising:
   receiving uncompressed video and analyzing a reference frame of the uncompressed video to determine a color palette;
   using the color palette, performing a compression selected from the group consisting of colorspace-reduction image compression and transform-based image compression on the reference frame to generate a compressed reference frame;
   determining difference blocks representing areas of a subsequent image frame that differ from the reference frame;
   generating a difference frame comprising compressed image data of the difference blocks;
   generating a video stream comprising the color palette, the compressed reference frame, and the difference frame, and storing the video stream in an extreme low-voltage memory; and
   injecting, into the video stream, a plurality of resynchronization codes for the reference frame and a plurality of resynchronization codes for the difference frame, the resynchronization codes comprising a byte sequence unique to resynchronization codes.

2. The method of claim 1 wherein resynchronization codes of the plurality of resynchronization codes comprise a position in an image frame.

3. A method of compressing and decompressing preview video comprising the method of claim 1 and further comprising:
   reading the video stream and using and compressed to decompress a decompressed reference frame;
   using the decompressed reference frame and the difference frame to decompress a subsequent image frame;
   detecting a bit error in the video stream and stopping decompression of the preview video at a first location in an image frame;
   scanning for a resynchronization code in the video stream; and
   resuming decompression of the preview video after the resynchronization code at a second location in the image frame.

4. The method of claim 3 further comprising interpolating between a prior frame and a subsequent frame to determine interpolated pixels, and insertion of the interpolated pixels into an image frame between the first and second location in the image frame.

5. A low power system comprising;
   a source of uncompressed video;
   a first compression engine configured to receive the uncompressed video and to produce first compressed video;
   a resynchronization code generator configured to insert resynchronization codes into the first compressed video;
   a low-voltage semiconductor memory coupled to store the first compressed video;
   a decompression unit configured to read the first compressed video from the low-voltage semiconductor memory and to decompress the first compressed video to produce a decompressed video;
   an error checker configured to scan the first compressed video as the first compressed video is read from the low-voltage semiconductor memory;
   a resynchronization code detector configured to scan the first compressed video as the first compressed video is read from the low-voltage semiconductor memory;
   where the decompression unit is configured to stop decompressing video upon the error checker detecting an error in a first frame and to resume decompression upon the resynchronization code detector detecting a resynchronization code.

6. A low power camera system comprising the low power system of claim 5 wherein the source of uncompressed video is an electronic video camera.

7. The low power camera system of claim 6 further comprising a recompression unit configured to compress the decompressed video to produce a second compressed video.

8. The low power camera system of claim 7 further comprising an interpolation unit configured to interpolate pixels of a prior and a subsequent frame to generate interpolated pixels and to insert the interpolated pixels into the first frame.

9. The low power camera system of claim 8 further configured to store the second compressed video in a nonvolatile memory.

10. The low power camera system of claim 8 further configured to transmit the second compressed video through a digital radio.

11. The low power camera system of claim 7 wherein the interpolation unit is configured to interpolate pixels within the first image frame between pixels decoded prior to the error checker detecting an error and the resynchronization code detector detecting a resynchronization code.

12. A method of compressing and storing preview video comprising:
    receiving uncompressed video and performing image compression on a frame of the uncompressed video to generate a compressed frame;
    generating a video stream comprising the compressed reference frame, and a compressed difference frame, and storing the video stream in an extreme low-voltage memory; and
    injecting, into the video stream, a plurality of resynchronization codes for the reference frame and a plurality of resynchronization codes for the difference frame, the resynchronization codes comprising a byte sequence unique to resynchronization codes.

13. The method of claim 12 wherein resynchronization codes of the plurality of resynchronization codes comprise a position in an image frame.

14. A method of compressing and decompressing preview video comprising the method of claim 12 and further comprising:
    reading the video stream and using the compressed reference to decompress a decompressed reference frame;
    using the decompressed reference frame and the difference frame to decompress a subsequent image frame;
    detecting a bit error in the video stream and stopping decompression of the preview video at a first location in a selected image frame selected from the decompressed image frame and the subsequent image frame;
    scanning for a resynchronization code in the video stream; and
    resuming decompression of the preview video after the resynchronization code at a second location in the selected image frame.

15. The method of claim 14 further comprising interpolating between a prior frame and a subsequent frame to determine interpolated pixels, and insertion of the interpolated pixels into the selected image frame between the first and second location in the image frame.

* * * * *